United States Patent
Carapelli et al.

(10) Patent No.: US 10,657,524 B2
(45) Date of Patent: May 19, 2020

(54) FUEL DISPENSING PAYMENT SYSTEM FOR SECURE EVALUATION OF CARDHOLDER DATA

(71) Applicants: Gilbarco Inc., Greensboro, NC (US); Gilbarco, S.R.L., Florence (IT)

(72) Inventors: Giovanni Carapelli, High Point, NC (US); Kenneth Ringeman, Kernersville, NC (US); Rodger Williams, Siler City, NC (US)

(73) Assignees: Gilbarco Inc., Greensboro, NC (US); Gilbarco, S.r.l., Florence (IT)

( * ) Notice: Subject to any disclaimer, the term of this patent is extended or adjusted under 35 U.S.C. 154(b) by 839 days.

(21) Appl. No.: 15/042,947

(22) Filed: Feb. 12, 2016

(65) Prior Publication Data

US 2016/0162888 A1    Jun. 9, 2016

Related U.S. Application Data

(62) Division of application No. 12/975,502, filed on Dec. 22, 2010, now Pat. No. 9,262,760.

(51) Int. Cl.
*G06Q 20/38* (2012.01)
*G07F 13/00* (2006.01)
(Continued)

(52) U.S. Cl.
CPC ......... *G06Q 20/3823* (2013.01); *G06Q 20/34* (2013.01); *G06Q 20/382* (2013.01);
(Continued)

(58) Field of Classification Search
CPC ............. G06Q 20/382; G06Q 20/3823; G06Q 20/3829
See application file for complete search history.

(56) References Cited

U.S. PATENT DOCUMENTS 5,228,084 A    7/1993    Johnson
5,448,638 A    9/1995    Johnson et al.
(Continued)

FOREIGN PATENT DOCUMENTS

WO    2009061788    5/2009
WO    2010141501    12/2010

OTHER PUBLICATIONS

Graziani. "The Human Factor—Still The Most Crucial". Tech Desk 87. Jan./Feb. 2007 [retrieved on Apr. 5, 2012]. Retrieved from the internet: <http://www.innova-card.com/upload/gestionFichiers/CNA0107_chip_vendor_focus_838.pdf>.

(Continued)

*Primary Examiner* — Steven S Kim
(74) *Attorney, Agent, or Firm* — Nelson Mullins Riley & Scarborough, LLP

(57) ABSTRACT

A secure evaluation assembly in which an encrypted communication of cardholder data from an input device to a remote host processing system may be securely evaluated. The secure evaluation assembly includes antitampering control electronics and a memory. The secure evaluation assembly memory contains information needed to decrypt data encrypted according to a first encryption method and information needed to encrypt data according to a second encryption method. Further, the secure evaluation assembly memory is encrypted according to a third encryption method. The antitampering control electronics are operative to decrypt the secure evaluation assembly memory and are further operative to decrypt cardholder data encrypted according to the first encryption method to produce unencrypted cardholder data. Finally, the antitampering control electronics are operative to evaluate the unencrypted cardholder data and encrypt the unencrypted cardholder data (Continued)

according to the second encryption method if the unencrypted cardholder data is payment cardholder data.

14 Claims, 6 Drawing Sheets

(51) Int. Cl.
    *G06Q 20/40*     (2012.01)
    *G07F 13/02*     (2006.01)
    *G06Q 20/34*     (2012.01)

(52) U.S. Cl.
    CPC ............ *G06Q 20/40* (2013.01); *G07F 13/00* (2013.01); *G07F 13/025* (2013.01); *G06Q 2220/00* (2013.01)

(56) References Cited

U.S. PATENT DOCUMENTS

| | | | |
|---|---|---|---|
| 5,892,900 A * | 4/1999 | Ginter | G06F 21/10 |
| | | | 726/26 |
| 5,903,652 A | 5/1999 | Mital | |
| 6,134,324 A | 10/2000 | Bohannon et al. | |
| 6,226,749 B1 * | 5/2001 | Carloganu | G06F 21/31 |
| | | | 726/2 |
| 6,738,901 B1 * | 5/2004 | Boyles | G06F 21/34 |
| | | | 713/159 |
| 6,801,835 B2 | 10/2004 | Covington | |
| 7,185,204 B2 | 2/2007 | Narayanaswami et al. | |
| 7,600,130 B2 | 10/2009 | Ooi et al. | |
| 7,607,576 B2 | 10/2009 | Robertson et al. | |
| 7,688,982 B2 | 3/2010 | Vauclair | |
| 7,708,193 B1 | 5/2010 | Segura | |
| 7,966,262 B2 | 6/2011 | Finley et al. | |
| 2002/0156676 A1 * | 10/2002 | Ahrens | G06Q 30/0215 |
| | | | 705/14.17 |
| 2003/0009382 A1 | 1/2003 | D'Arbeloff et al. | |
| 2003/0212899 A1 | 11/2003 | Curtis | |
| 2004/0015417 A1 | 1/2004 | Youngman | |
| 2004/0143594 A1 | 7/2004 | Kalies | |
| 2004/0182921 A1 | 9/2004 | Dickson et al. | |
| 2004/0188516 A1 | 9/2004 | De Myttennaere | |
| 2004/0193553 A1 | 9/2004 | Lloyd et al. | |
| 2005/0160050 A1 | 7/2005 | Payne | |
| 2006/0224449 A1 * | 10/2006 | Byerley | G06Q 30/0226 |
| | | | 705/14.27 |
| 2006/0236124 A1 | 10/2006 | Polozoff | |
| 2006/0265736 A1 * | 11/2006 | Robertson | G06Q 20/08 |
| | | | 726/3 |
| 2006/0271431 A1 | 11/2006 | Wehr | |
| 2007/0033398 A1 | 2/2007 | Robertson et al. | |
| 2007/0256126 A1 | 11/2007 | Erickson et al. | |
| 2007/0276765 A1 * | 11/2007 | Hazel | G06F 21/72 |
| | | | 705/71 |
| 2008/0040287 A1 | 2/2008 | Harrell et al. | |
| 2008/0235140 A1 | 9/2008 | Read | |
| 2008/0235141 A1 * | 9/2008 | Hilerio | G06F 21/105 |
| | | | 705/59 |
| 2008/0313028 A1 | 12/2008 | Williams et al. | |
| 2009/0070583 A1 | 3/2009 | von Mueller et al. | |
| 2009/0154696 A1 | 6/2009 | Robertson et al. | |
| 2009/0222383 A1 | 9/2009 | Tato et al. | |
| 2009/0234912 A1 * | 9/2009 | Perrine | H04L 67/06 |
| | | | 709/203 |
| 2009/0265638 A1 | 10/2009 | Carapelli et al. | |
| 2009/0310778 A1 | 12/2009 | Mueller et al. | |
| 2010/0057621 A1 | 3/2010 | Faith et al. | |
| 2010/0095119 A1 * | 4/2010 | Tachibana | H04W 12/04 |
| | | | 713/168 |
| 2010/0268612 A1 | 10/2010 | Berrio et al. | |
| 2010/0318468 A1 | 12/2010 | Carr et al. | |
| 2011/0047081 A1 | 2/2011 | Kelly et al. | |
| 2011/0238511 A1 | 9/2011 | Park et al. | |
| 2011/0321173 A1 * | 12/2011 | Weston | G06F 21/554 |
| | | | 726/27 |

OTHER PUBLICATIONS

International Search Report and Written Opinion, dated May 1, 2012, for corresponding PCT Application PCT/US2011/066203.
English Translation of office action issued by Colombian Patent Office in corresponding Colombian patent application No. 13-169786.
English translation of second office action issued by Colombian Patent Office in corresponding Colombian patent application No. 13-169786.
English translation of first examination report issued by Chile Patent Office dated Jan. 27, 2015 in corresponding Chilean patent application No. 1851-2013.
Extended European Search Report dated Aug. 5, 2015 for corresponding European Patent Application No. 11850448.9.
European Patent Office, Communication Pursuant to Article 94(3) EPC, dated Oct. 23, 2017, received in corresponding European Application No. 11850448.9.
International Organization for Standardization & International Electrotechnical Commission, International Standard No. ISO/IEC 7812-1:2006(E), Identification cards—Identification of issuers—Part 1: Numbering system, 3rd ed., Oct. 15, 2006.

* cited by examiner

FUEL DISPENSING PAYMENT SYSTEM FOR SECURE EVALUATION OF CARDHOLDER DATA

PRIORITY CLAIM

This application is a divisional application of copending utility application Ser. No. 12/975,502, entitled "Fuel Dispensing Payment System for Secure Evaluation of Cardholder Data," filed on Dec. 22, 2010. The foregoing application is relied upon and incorporated by reference herein in its entirety for all purposes.

FIELD OF THE INVENTION

The present invention relates generally to fuel dispensing and other retail payment systems. More particularly, the invention relates to a device and method for creating a secure evaluation assembly at a retail terminal or point of sale (POS) and securely evaluating an encrypted communication from the terminal or POS to a host computer.

BACKGROUND OF THE INVENTION

Payment systems have been incorporated into fueling sites in order to allow a customer to pay for fuel and other goods and services (such as fast food or convenience store products) using a credit or debit card. Loyalty or program-specific cards that entitle the customer to a fixed credit or percentage discount or other favorable pricing are also typically accepted.

Such payment systems comprise various input devices, such as card readers and PIN pads, that are configured to accept data necessary to process the payment. The customer may provide certain payment data by swiping a payment card bearing a magnetic stripe through a card reader. Data stored in the magnetic stripe may include a Primary Account Number (PAN), the cardholder's name, a service code, and the card's expiration date. Also, if required to complete the transaction, the customer may enter a personal identification number (PIN) using a PIN pad. The system communicates the data to a remote host system responsible for the customer's account for verification.

Because of the continuing challenges fraud poses to customers, merchants, and banks, among others, payment card companies are requiring more and more security during payment card transactions. For example, organizations that process, store, or transmit payment cardholder data must comply with certain industry standards. Merchants and service providers must demonstrate compliance with the standards on a recurrent basis, a costly and complex process.

One method of processing and transmitting payment cardholder data is known as end-to-end encryption (E2EE). In a typical implementation of E2EE, cardholder data is encrypted at an input device and remains encrypted until it reaches its intended destination (usually, a host computer). Payment cardholder data is never accessible to a merchant in clear-text form as it passes through intermediate system components.

Although use of E2EE provides a high level of security for payment cardholder data, it presents certain problems for merchants. For example, merchants require portions of the payment cardholder data for reconciliation purposes. However, in a system employing E2EE, merchants cannot access the cardholder data after it is encrypted at an input device. Thus, if a customer disputes a transaction, the merchant cannot verify the PAN in order to prove that the transaction occurred. Likewise, the merchant cannot credit a customer's account or manually complete a transaction that was previously declined in error.

Further, industry standards governing payment card transactions typically do not apply to nonsensitive cardholder data from other cards processed on-site or in a private retailer's network, such as data from loyalty or program-specific cards. However, in an E2EE system, this data is encrypted at the input device along with payment cardholder data. Thus, for example, the merchant cannot access loyalty card data in order to give the customer credit for a transaction.

SUMMARY OF THE INVENTION

The present invention recognizes and addresses disadvantages of prior art constructions and methods. In one aspect, the present invention provides a secure evaluation assembly in which an encrypted communication of cardholder data from an input device to a remote host processing system may be securely evaluated. The secure evaluation assembly comprises antitampering control electronics and a secure evaluation assembly memory. The secure evaluation assembly memory contains information needed to decrypt data encrypted according to a first encryption method and information needed to encrypt data according to a second encryption method. Further, the secure evaluation assembly memory is encrypted according to a third encryption method. The antitampering control electronics are adapted to decrypt the secure evaluation assembly memory and are further adapted to decrypt cardholder data encrypted according to the first encryption method to produce unencrypted cardholder data. Finally, the antitampering control electronics are further adapted to evaluate the unencrypted cardholder data and encrypt the unencrypted cardholder data according to the second encryption method if the unencrypted cardholder data is payment cardholder data.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
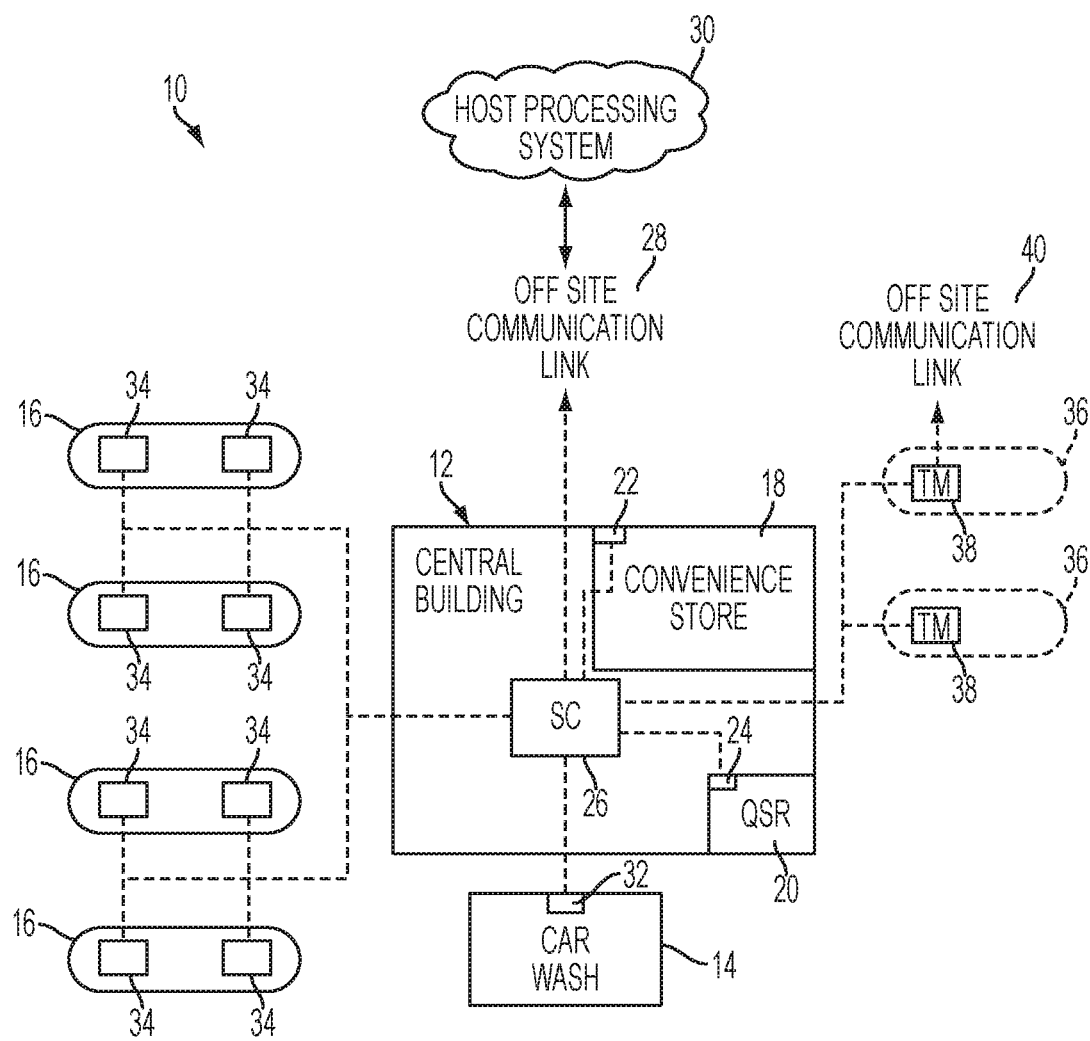
FIG. 1 is a schematic illustration of a retail fuel dispensing environment which may utilize an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, "payment cardholder data" refers to information associated with a payment cardholder, including a PAN or other account number, the cardholder's name, a service code, and the card's expiration date. "Nonsensitive cardholder data" refers to data associated with payment devices processed on-site or in a private retailer's network, such as data from loyalty or program-specific cards. Because data received at an input device is immediately encrypted as described below, the system may not be able to distinguish between payment cardholder data and nonsensitive cardholder data until the data are evaluated in the secure evaluation assembly (SEA). Thus, as used herein, "cardholder data" refers to either or both of payment cardholder data and nonsensitive cardholder data before evaluation in the SEA.

Embodiments of the present invention provide a retail payment system which enables E2EE of payment cardholder data while allowing access to nonsensitive cardholder data. The system comprises an SEA in which cardholder data encrypted according to a first encryption method and transmitted from an input device may be securely evaluated. In some embodiments, the SEA may comprise a dongle having an antitampering chip. If the SEA determines that encrypted cardholder data transmitted from an input device is nonsensitive cardholder data, the data may be made available in clear-text form for local processing. If the SEA determines that the encrypted cardholder data is payment cardholder data, the data may be encrypted according to a second encryption method and transmitted to a remote host network for authentication. Because the system provides E2EE of payment cardholder data, a merchant is unable to access payment cardholder data in clear-text form. In further embodiments, a merchant may be able to reconcile or validate one or more transactions via the SEA.

The term "encryption method" as used herein refers to encryption schemes, algorithms, and/or keys used to encrypt and decrypt cardholder data. The first encryption method may be the same as the second encryption method but they may utilize different algorithms. It should be further understood that the two encryption methods may utilize the same or similar encryption algorithms but may utilize different encryption keys. That is, the first and second encryption methods may utilize the same or different schemes, standards, algorithms, and/or keys. In many embodiments, the first encryption method may be provided by the vendor of the device tasked with transmitting the cardholder data to the SEA. Alternatively, the first encryption method is injected into the input device and the SEA. The second encryption method may be provided by a financial institution operatively connected to the retail payment system.

Any suitable encryption method known to those of skill in the art may be used in accordance with the present invention, but the method used may preferably comply with or exceed industry standards. For example, the encryption methods may include Rivest-Shamir-Adelman (RSA) and triple Data Encryption Standard (DES). Also, as those of skill in the art will appreciate, the encryption method used may be dictated by encryption methods required by a host network. Background information on encryption in retail environments is provided in U.S. Pat. No. 5,448,638 (entitled "Security Apparatus and System for Retail Environments"), hereby incorporated by reference in its entirety for all purposes.

Finally, as used herein, the term "input device" broadly refers to secure devices capable of receiving payment cardholder data and nonsensitive cardholder data, including but not limited to encrypting PIN pads, keypads, touchscreens, secure card readers, and smartcard readers. Desirably, all input devices used in accordance with the present invention comprise a secure encryption processor and a memory or storage unit. The memory of the input devices stores one or more encryption algorithms, keys, and/or ciphers used to immediately encrypt cardholder data upon receipt according to the first encryption method. In a preferred embodiment, the input devices may allow triple-DES derived unique key per transaction (DUKPT) encryption of cardholder data.

The input devices are also preferably configured to be antitampering so that in the case of unauthorized access, the input device's contents, including data contained in or handled by the input device's processor, are erased, deleted, or destroyed. Alternatively, any portion of the contents of the input device sufficient to identify payment cardholder data is erased should the input device be tampered with. However, those of skill in the art will appreciate that, in some embodiments, where an input device is adapted to encrypt cardholder data, such as via an encrypting head, the input device may not need to be antitampering. Also, in preferred embodiments, the input devices may be further adapted to prevent real-time "skimming" or theft of cardholder data.

Some embodiments of the present invention are particularly suitable for use in transactions in a retail service station environment, and the below discussion will describe preferred embodiments in that context. However, those of skill in the art will understand that the present invention is not so limited. In fact, it is contemplated that the present invention be used with any appropriate retail environment.

Referring now to FIG. 1, an exemplary fueling environment 10 may comprise a central building 12, a car wash 14, and a plurality of fueling islands 16. The central building 12 need not be centrally located within the fueling environment 10, but rather is the focus of the fueling environment 10, and may house a convenience store 18 and/or a quick serve restaurant 20 therein. Both the convenience store 18 and the quick serve restaurant 20 may include a point of sale (POS) 22, 24, respectively. POS 22, 24 may comprise a single computer or server operatively connected to an associated card reader and payment terminal. Additionally, POS 22, 24 may include a display, a touch screen, and/or other input devices.

The central building 12 may further house a site controller (SC) 26, which in an exemplary embodiment may be the PASSPORT® POS system, sold by Gilbarco Inc. of Greensboro, N.C., although third party site controllers may be used.

Site controller 26 may control the authorization of fueling transactions and other conventional activities as is well understood, and site controller 26 may preferably be in operative communication with each POS. Alternatively, site controller 26 may be incorporated into a POS, such as point of sale 22 if needed or desired.

Further, site controller 26 may have an off-site communication link 28 allowing communication with a remote host processing system 30 for credit/debit card authorization, content provision, reporting purposes or the like, as needed or desired. In one embodiment, communication link 28 may be a stand alone router, switch, or gateway, although it should be appreciated that site controller 26 may additionally perform the functions of, and therefore replace, such a device. The off-site communication link 28 may be routed through the Public Switched Telephone Network (PSTN), the Internet, both, or the like, as needed or desired. Remote host processing system 30 may comprise at least one server maintained by a third party, such as a financial institution. Although only one remote host processing system 30 is illustrated, those of skill in the art will appreciate that in a retail payment system allowing payment via payment devices issued by multiple payment card companies or financial institutions, site controller 26 may be in communication with a plurality of remote host processing systems 30.

Car wash 14 may have a POS 32 associated therewith that communicates with site controller 26 for inventory and/or sales purposes. Car wash 14 alternatively may be a stand alone unit. Note that car wash 14, convenience store 18, and quick serve restaurant 20 are all optional and need not be present in a given fueling environment.

Fueling islands 16 may have one or more fuel dispensers 34 positioned thereon. Fuel dispensers 34 may be, for example, the ENCORE® sold by Gilbarco Inc. of Greensboro, N.C. Fuel dispensers 34 are in electronic communication with site controller 26 through any suitable link, such as two wire, RS 422, Ethernet, wireless, etc. if needed or desired.

Fueling environment 10 also has one or more underground storage tanks (USTs) 36 adapted to hold fuel therein. As such, USTs 36 may each be a double walled tank. Further, each UST 36 may include a tank monitor (TM) 38 associated therewith. Tank monitors 38 may communicate with fuel dispensers 34 (either through site controller 26 or directly, as needed or desired) to determine amounts of fuel dispensed and compare fuel dispensed to current levels of fuel within USTs 36 to determine if USTs 36 are leaking.

Tank monitor 38 may communicate with site controller 26 and further may have an off-site communication link 40 for leak detection reporting, inventory reporting, or the like. Much like off-site communication link 28, off-site communication link 40 may be through the PSTN, the Internet, both, or the like. If off-site communication link 28 is present, off-site communication link 40 need not be present and vice versa, although both links may be present if needed or desired.

Further information on and examples of fuel dispensers and retail fueling environments are provided in U.S. Pat. No. 6,453,204 (entitled "Fuel Dispensing System"); U.S. Pat. No. 5,956,259 (entitled "Intelligent Fueling"); U.S. Pat. No. 5,734,851 (entitled "Multimedia Video/Graphics in Fuel Dispensers"); U.S. Pat. No. 6,052,629 (entitled "Internet Capable Browser Dispenser Architecture"); U.S. Pat. No. 5,689,071 (entitled "Wide Range, High Accuracy Flow Meter"); U.S. Pat. No. 6,935,191 (entitled "Fuel Dispenser Fuel Flow Meter Device, System and Method"); and U.S. Pat. No. 7,289,877 (entitled "Fuel Dispensing System for Cash Customers"), all of which are hereby incorporated by reference in their entireties for all purposes. An exemplary tank monitor 38 may be the TLS-350R manufactured and sold by the Veeder-Root Company of Simsbury, Conn. For more information about tank monitors and their operation, reference is made to U.S. Pat. No. 5,423,457 (entitled "Real time tank product loss detection system"); U.S. Pat. No. 5,400,253 (entitled "Automated Statistical Inventory Reconciliation System for Convenience Stores and Auto/truck Service Stations"); U.S. Pat. No. 5,319,545 (entitled "System to Monitor Multiple Fuel Dispensers and Fuel Supply Tank"); and U.S. Pat. No. 4,977,528 (entitled "Apparatus and Method for Determining the Amount of Material in A Tank"), all of which are hereby incorporated by reference in their entireties for all purposes.

Figure 2:
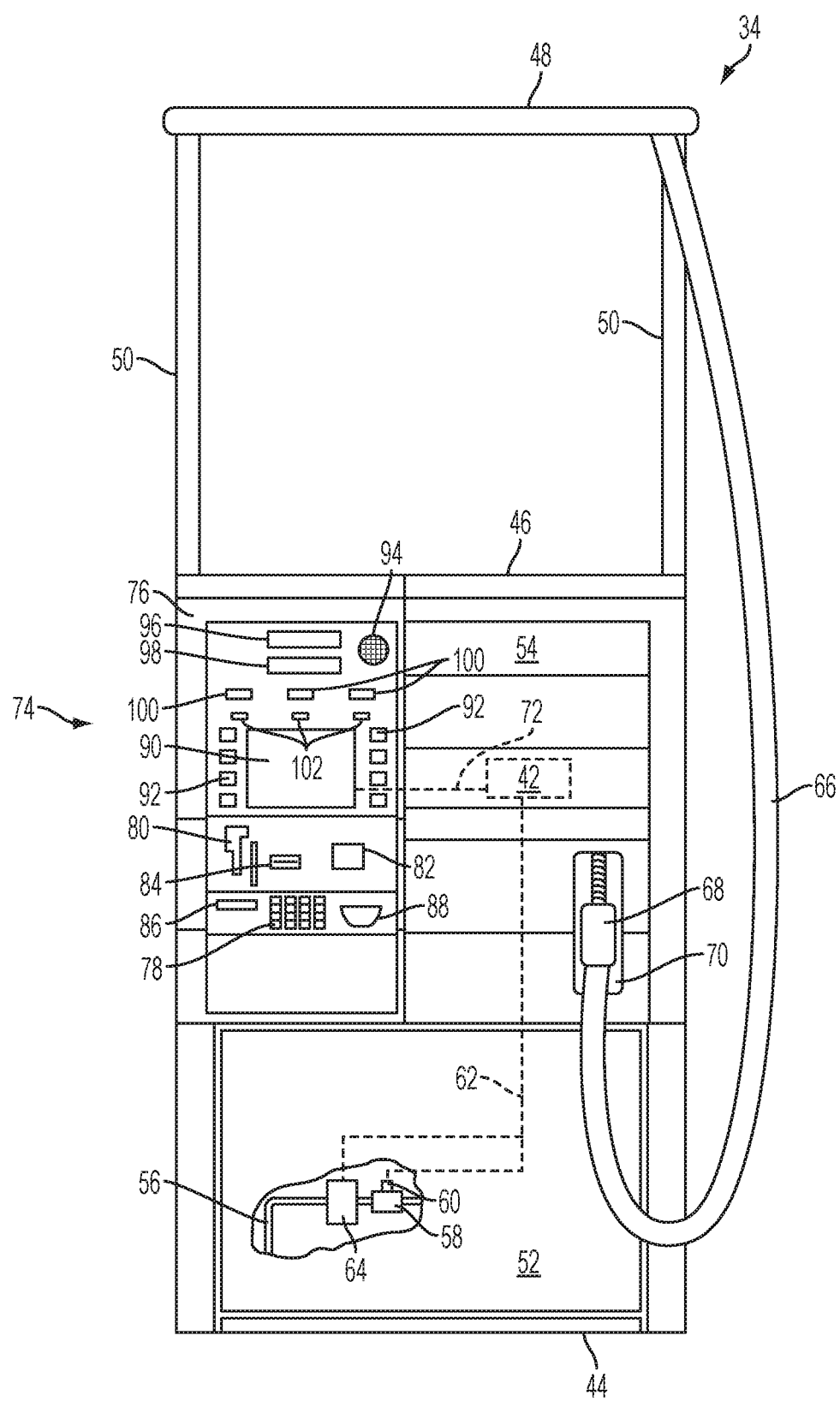
FIG. 2 is a front elevational view of an exemplary fuel dispenser that may operate with a POS device and/or a site controller within the retail fueling environment of FIG. 1.

FIG. 2 illustrates a fuel dispenser 34 that may operate in association with site controller 26 according to an embodiment of the present invention. Dispenser 34 includes a control system 42, which may be a processor, microprocessor, controller, microcontroller, or other suitable electronics with associated memory and software programs running thereon. In a preferred embodiment, control system 42 is comparable to the microprocessor-based control systems used in CRIND (card reader in dispenser) and TRIND (tag or transponder reader in dispenser) type units sold by Gilbarco Inc. Control system 42 is in operative communication with site controller 26. Control system 42 further controls various aspects of the fuel dispenser 34 as described in more detail below.

The memory of control system 42 may be any memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of non-volatile memories, such as secure digital (SD), flash memory, memory stick, or any other medium that may be used to carry or store computer program code in the form of computer-executable programs, instructions, or data. Control system 42 may also include a portion of memory accessible only to control system 42.

In the illustrated embodiment, dispenser 34 has a base 44 and a top 46, with a canopy 48 supported by two side panels 50. Fuel dispenser 34 is subdivided into multiple compartments. A hydraulic area 52 encloses hydraulic components and an electronic area 54 encloses electronic components. A vapor barrier may be used to separate the hydraulic area 52 from the electronic area 54.

Several components used to control fuel flow may be housed within the hydraulic area 52. Fuel from USTs 36 is pumped through a piping network into inlet pipe 56. Fuel being dispensed passes though a meter 58, which is responsive to flow rate or volume. A displacement sensor 60 is employed to generate a signal in response to fuel flow though the meter 58. Control/data lines 62 provide a signaling path from sensor 60 to control system 42, and provide signals to control system 42 indicative of the flow of fuel being dispensed. Control/data lines 62 may provide control signaling to a valve 64 that may be opened and closed to permit or not permit dispensing of fuel.

Meter flow measurements from sensor 60 are collected by control system 42. Control system 42 also typically performs calculations such as cost associated with a fuel dispensing transaction. Additionally, control system 42 controls transactional processing at fuel dispenser 34 as will be described in more detail below.

As a dispensing transaction progresses, fuel is then delivered to a hose 66 and through a nozzle 68 into the customer's vehicle. Dispenser 34 includes a nozzle boot 70, which may be used to hold and retain nozzle 68 when not in use. Nozzle boot 70 may include a mechanical or electronic switch to indicate when nozzle 68 has been removed for a fuel dispensing request and when nozzle 68 has been replaced, signifying the end of a fueling transaction. A control line provides a signaling path from the electronic switch to control system 42. Control system 42 may use signaling received via the control line in order to make a determination as to when a transaction has been initiated or completed.

Control/data lines 72 provide electronic communication between control system 42 and a user interface 74. User interface 74 includes various combinations of subsystems to facilitate customer interaction with dispenser 34 and acceptance of payment for dispensed fuel. A bezel 76 acts as a lip around the various subsystems of interface 74. In most cases, bezel 76 is flush with the face of the fuel dispenser; however, in some embodiments it may extend outwardly from the face, in effect forming a raised lip. Bezel 76 may also comprise a plurality of sections that frame or house various subsystems or components.

As shown, user interface 74 includes several input devices. For example, user interface 74 may include a keypad 78. Keypad 78 is typically used for entry of a PIN if the customer is using a debit card for payment of fuel or other goods or services. In a preferred embodiment, keypad 78 may be the FlexPay™ encrypting PIN pad offered by Gilbarco Inc.

User interface 74 may also include a secure card reader 80 for accepting credit, debit, or other magnetic stripe cards for payment. Additionally, secure card reader 80 may accept loyalty or program-specific cards as described above. Card reader 80 comprises a mechanism for receiving payment card data, such as a read head in the case of a magnetic stripe card reader, as well as at least one input-output ("I/O") port for receiving and loading the encryption keys of the first encryption method. In presently preferred embodiments, card reader 80 may be analogous to the MagTek® PermaSeal secure card reader or the FlexPay™ secure card reader offered by Gilbarco Inc.

User interface 74 may also include other input devices such as a contactless card reader 82 (e.g., for integrated circuit or "smart" cards). Further, user interface 74 may include other payment or transactional devices such as a bill acceptor 84, a receipt printer 86, and a change delivery device 88. Receipt printer 86 may provide a customer with a receipt with a recording of the transaction carried out at fuel dispenser 34. Change delivery device 88 may deliver change to a customer for overpayment. Other transactional devices, such as an optical reader and a biometric reader, are also contemplated.

A display 90 may be used to display information, such as transaction-related prompts and advertising, to the customer. In some embodiments, a touch screen may be used for display 90. In this case, display 90 may be configured to display a virtual keypad for receiving payment data such as a PIN of a debit card or the billing zip code of a credit card, for instance. Display 90 may also be used to receive a selection from the customer regarding the displayed information.

The customer may use soft keys 92 to respond to information requests presented to the user via the display 90. An intercom 94 may be provided to generate audible cues for the customer and to allow the customer to interact with an attendant. In addition, dispenser 34 may include a transaction price total display 96 that presents the customer with the price for fuel that is dispensed. A transaction gallon total display 98 may be used to present the customer with the measurement of fuel dispensed in units of gallons or liters. Octane selection buttons 100 may be provided for the customer to select which grade of fuel is to be dispensed before dispensing is initiated. Finally, price per unit (PPU) displays 102 may be provided to show the price per unit of fuel dispensed in either gallons or liters, depending on the programming of dispenser 34.

Figure 3:
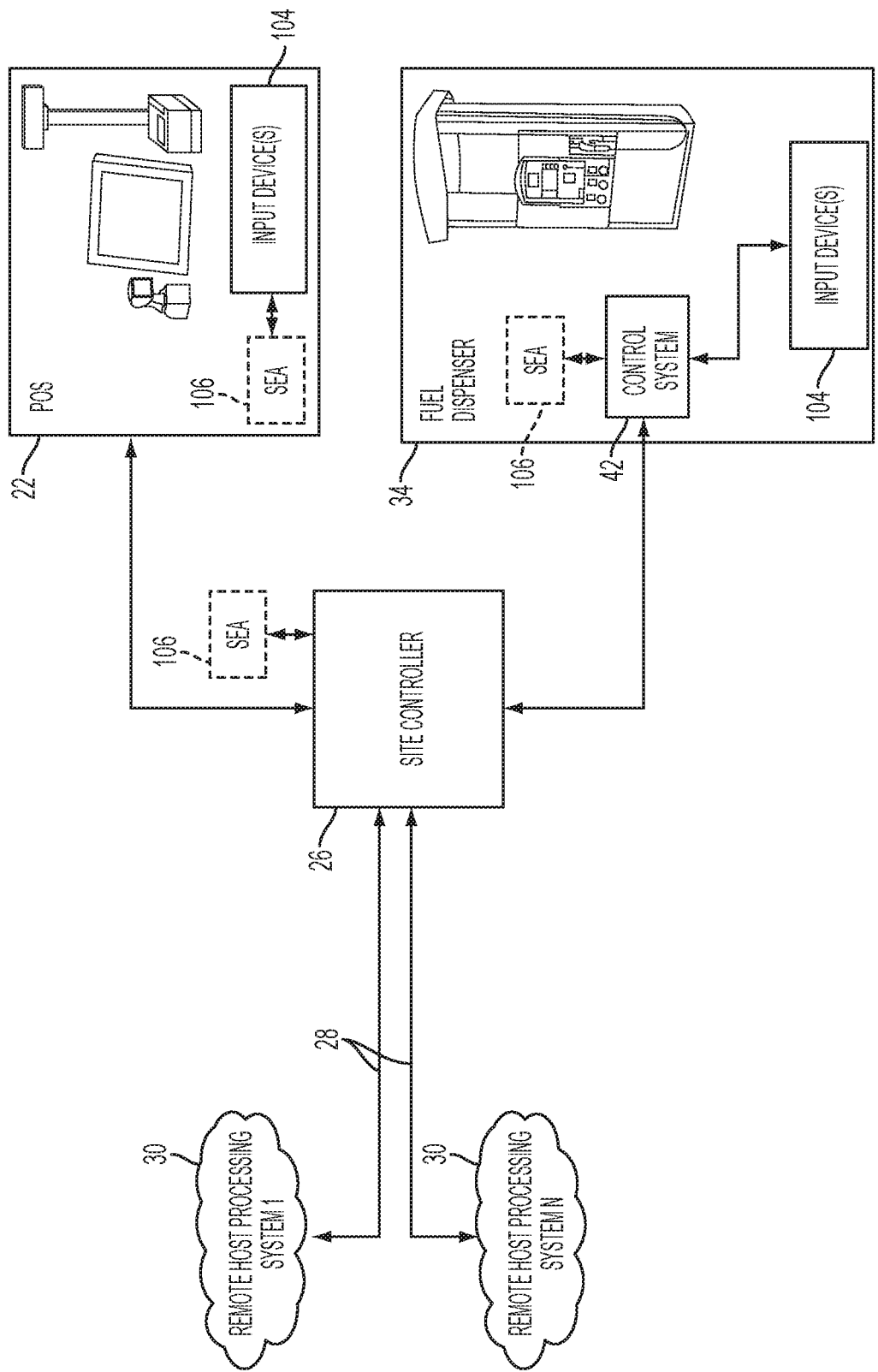
FIG. 3 is a diagrammatic illustration of a payment system having a secure evaluation assembly according to an embodiment of the present invention.

FIG. 3 provides a diagrammatic illustration of a payment system having an SEA according to an embodiment of the present invention. In general, the SEA enables a retail payment system to provide E2EE of payment cardholder data while allowing access to nonsensitive cardholder data for local processing. More particularly, as explained above in reference to FIGS. 1 and 2, fuel dispensers 34 may comprise a user interface comprising one or more input devices 104, such as a secure card reader. Input devices 104 are in electronic communication with control system 42, and control system 42 is in operative communication with site controller 26. Also, POS 22 (or 24, 32) comprises one or more input devices 104 and is in operative communication with site controller 26. Site controller 26 may be in communication with N remote host processing systems 30 via off-site communication link 28. Although only one POS 22 and fuel dispenser 34 are shown in FIG. 3 to facilitate illustration, those of skill in the art will appreciate that site controller 26 may typically communicate with a plurality of POS 22 and fuel dispensers 34.

According to embodiments of the present invention, any device in the retail payment system which handles or processes cardholder data may comprise an SEA (hereinafter a "cardholder data handling device"), including the input devices described above. As described in more detail below, an SEA preferably comprises antitampering control electronics and encrypted memory. The SEA may be adapted to receive encrypted cardholder data from one or more input devices and evaluate the data within the antitampering control electronics to determine whether it is payment cardholder data or nonsensitive cardholder data. The SEA may also comprise an encrypted transaction log against which encrypted payment cardholder data may be compared for reconciliation or validation purposes.

As shown, for example, an SEA 106 may be operatively connected to any of site controller 26, POS 22, and fuel dispenser control system 42. Site controller 26 and POS 22 are shown as separate devices in FIG. 3, but it will be appreciated that site controller 26 may be incorporated into a POS 22 as noted above. In a preferred embodiment, the SEA may comprise a dongle that may be coupled to a cardholder data handling device. For example, SEA 106 may have a universal serial bus (USB) interface that may connect to a USB port at POS 22. Alternatively, the dongle may be located inside of fuel dispenser 34 and connected to a USB interface at control system 42. Although the SEA may communicate with a cardholder data handling device via any suitable interface, including but not limited to Ethernet and parallel and serial interfaces, those of skill in the art will appreciate that the high communications speed that a USB interface offers may be desirable for certain functions of the SEA, including reconciliation. Further, where the SEA is implemented as a dongle, the SEA may be easily moved from one cardholder data handling device to another in case the first device malfunctions.

According to an alternative embodiment, the SEA may be implemented as an antitampering central processing unit (CPU) rather than as a dongle. As with the dongle embodiment, the CPU may be provided in any cardholder data handling device. In some cases, the CPU may replace and perform the functions of the device's processor or control system. The CPU may comprise an encrypted memory that may be analogous to the encrypted SEA memory described below. This encrypted memory may be in addition to other internal memory of the CPU. In the alternative, the CPU may communicate with an encrypted SEA memory external to the CPU. In one embodiment, the antitampering CPU may be analogous to the secure controller described in U.S. Pre-Grant Pub. No. 2009/0265638, entitled "System and Method for Controlling Secure Content and Non-secure Content at a Fuel Dispenser or Other Retail Device," hereby incorporated by reference in its entirety for all purposes.

Although embodiments are contemplated in which more than one SEA 106 is provided, a retail payment system according to the present invention may preferably comprise a single SEA 106 which receives and evaluates all encrypted cardholder data transmitted through the system. In other words, SEA 106 may evaluate encrypted cardholder data transmitted by an input device 104 regardless of the location of SEA 106 and input device 104. For example, if POS 22 comprises SEA 106 and a customer provides cardholder data via an input device 104 at fuel dispenser 34, the encrypted cardholder data is still transmitted to SEA 106 for evaluation. Those of skill in the art will appreciate that this may facilitate compliance with industry standards.

Figure 4:
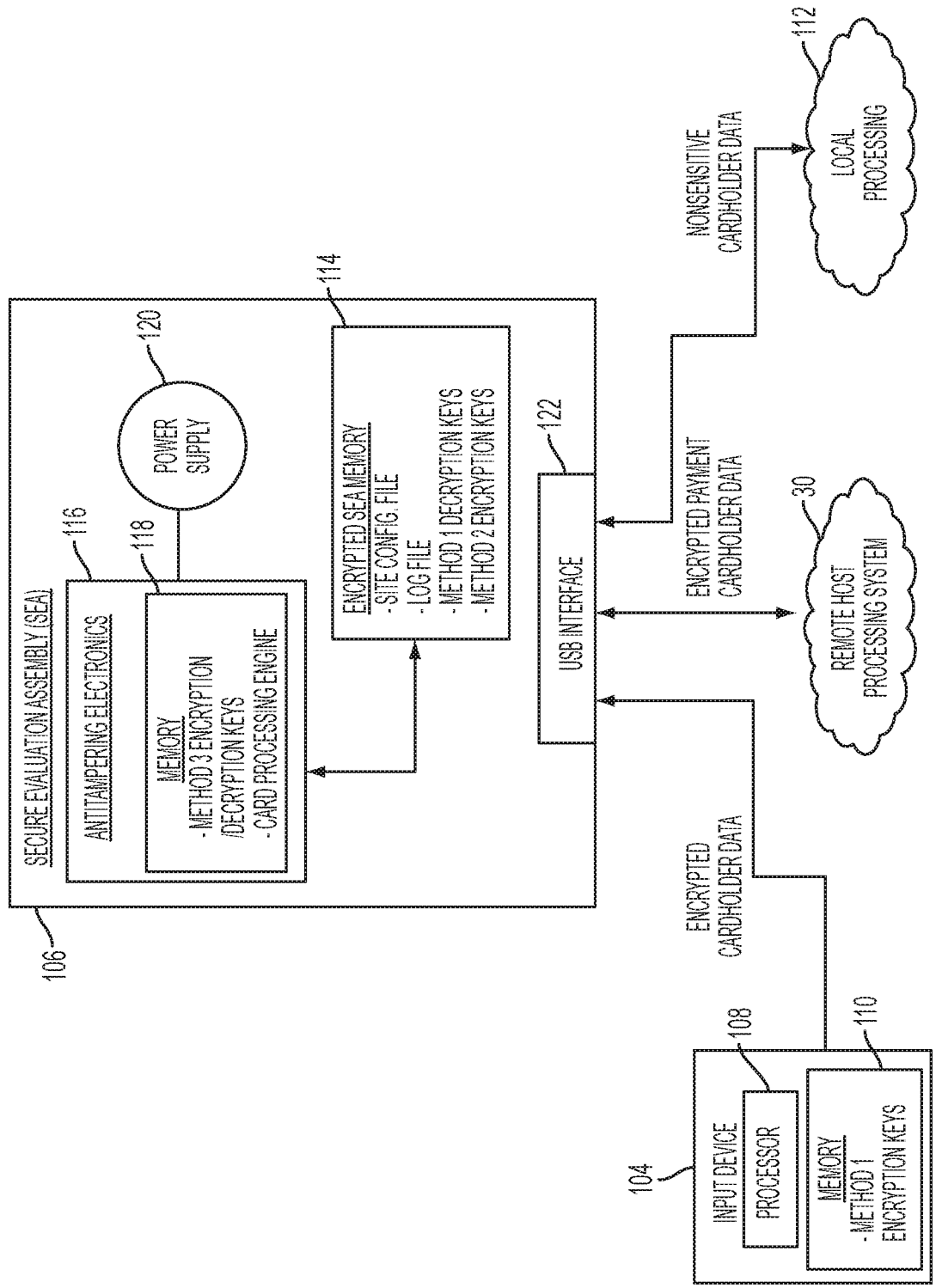
FIG. 4 is a schematic illustration of a secure evaluation assembly adapted for evaluating cardholder data transmitted from an input device to a remote host processing system according to an embodiment of the present invention.

FIG. 4 is a schematic illustration of an SEA adapted for securely evaluating cardholder data transmitted from an input device to a remote host processing system according to an embodiment of the present invention. In particular, input device 104, which comprises a secure encryption processor 108 and a memory 110, may be in electronic communication with SEA 106. Processor 108 may be adapted to immediately encrypt cardholder data received at input device 104 according to the first encryption method based on encryption keys located in memory 110. SEA 106 may also be in electronic communication with remote host processing system 30. Encrypted communications between input device 104 and SEA 106 and between SEA 106 and remote host processing system 30 may pass through one or more intermediate devices, depending on the respective locations of input device 104 and SEA 106 within the retail payment system. Finally, SEA 106 is preferably in electronic communication with a local processing system 112, which may comprise one or more devices in communication with a local or private retailer network adapted to receive and process nonsensitive cardholder data. This may occur, for example, in the POS system of the fueling environment.

The SEA preferably comprises encrypted SEA memory and antitampering control electronics. The antitampering control electronics may also comprise internal memory. These memories may comprise computer-executable program code or instructions that, when executed by the antitampering control electronics, perform one or more steps of the processes described above and in more detail below. The memories may also comprise data and one or more data structures for storing information. The computer-executable program code or instructions in this scenario, as should be known to those skilled in the art, usually include one or more application programs, other program modules, program data, firmware, and/or an operating system.

As shown, for example, SEA 106 comprises an SEA memory 114 and antitampering control electronics 116 having internal memory 118. A power supply 120, such as a battery or the like, may be provided to preserve the integrity of data in memory 118 and power antitampering control electronics 116 when the SEA 106 is not connected to a primary power source, such as a cardholder data handling device. Communications to and from SEA 106 may pass through a USB interface 122 as discussed above.

The antitampering control electronics may preferably be implemented as a secure integrated circuit (IC) or chip. Further, the antitampering control electronics preferably incorporates physical and/or logical protection mechanisms designed to deter tampering. In a presently preferred embodiment, antitampering control electronics 116 may be the USIP™ Professional IC, sold by Maxim Integrated Products, Inc. of Sunnyvale, Calif. However, those of skill in the art will appreciate that any control electronics providing analogous functionality may be used for control electronics 116. Importantly, the antitampering control electronics are preferably programmed to disallow passage of payment cardholder data from the SEA unless it is encrypted according to the second encryption method.

The internal memory of the antitampering control electronics may comprise any type of memory as discussed above in reference to control system 42 and may preferably store one or more encryption algorithms, keys, and/or ciphers used to communicate with the encrypted SEA memory according to a third encryption method. In one embodiment, internal memory 118 may comprise a static random-access memory (SRAM). Also, in the case of unauthorized access, the protection mechanisms described above are preferably enabled to erase, delete, or destroy the contents of the internal memory. Thus, for example, if a thief attempts to obtain the decryption keys for the third encryption method from memory 118 by tampering with antitampering control electronics 116, the protection mechanisms may cause the decryption keys for the third encryption method (or the entirety of memory 118) to be erased. In either case, encrypted SEA memory 114 would no longer be readable. Further, the internal memory of the antitampering control electronics may include a card processing engine. In particular, the card processing engine may evaluate cardholder data that has been decrypted within the antitampering control electronics to determine whether the cardholder data should be encrypted according to the second encryption method and transmitted to a remote host processing system or made available in clear-text form for local processing.

As noted above, SEA memory 114 may be encrypted according to a third encryption method. Preferably, the antitampering control electronics may employ on-the-fly encryption (OTFE) to read from and write to the encrypted SEA memory. The third encryption method is preferably distinct from the first and second encryption methods, and in one embodiment, the third encryption method may be the 128-bit Advanced Encryption Standard (AES-128). Desirably, the USIP™ chip may perform OTFE of an SEA memory using AES-128.

In preferred embodiments, SEA memory 114 may preferably be injected with the decryption keys for the first encryption method and the encryption keys for the second encryption method. Thereby, antitampering control electronics 116 may decrypt cardholder data transmitted to SEA 106 from an input device and encrypt payment cardholder data before transmitting it to a remote host processing system. SEA memory 114 may preferably comprise flash memory, but as with the internal memory of the antitampering control electronics discussed above, the SEA memory may comprise any suitable type of memory. Also, as described in more detail below, encrypted SEA memory 114 preferably stores a site configuration file against which cardholder data may be compared and a log file for reconciliation or validation purposes.

Figure 5:
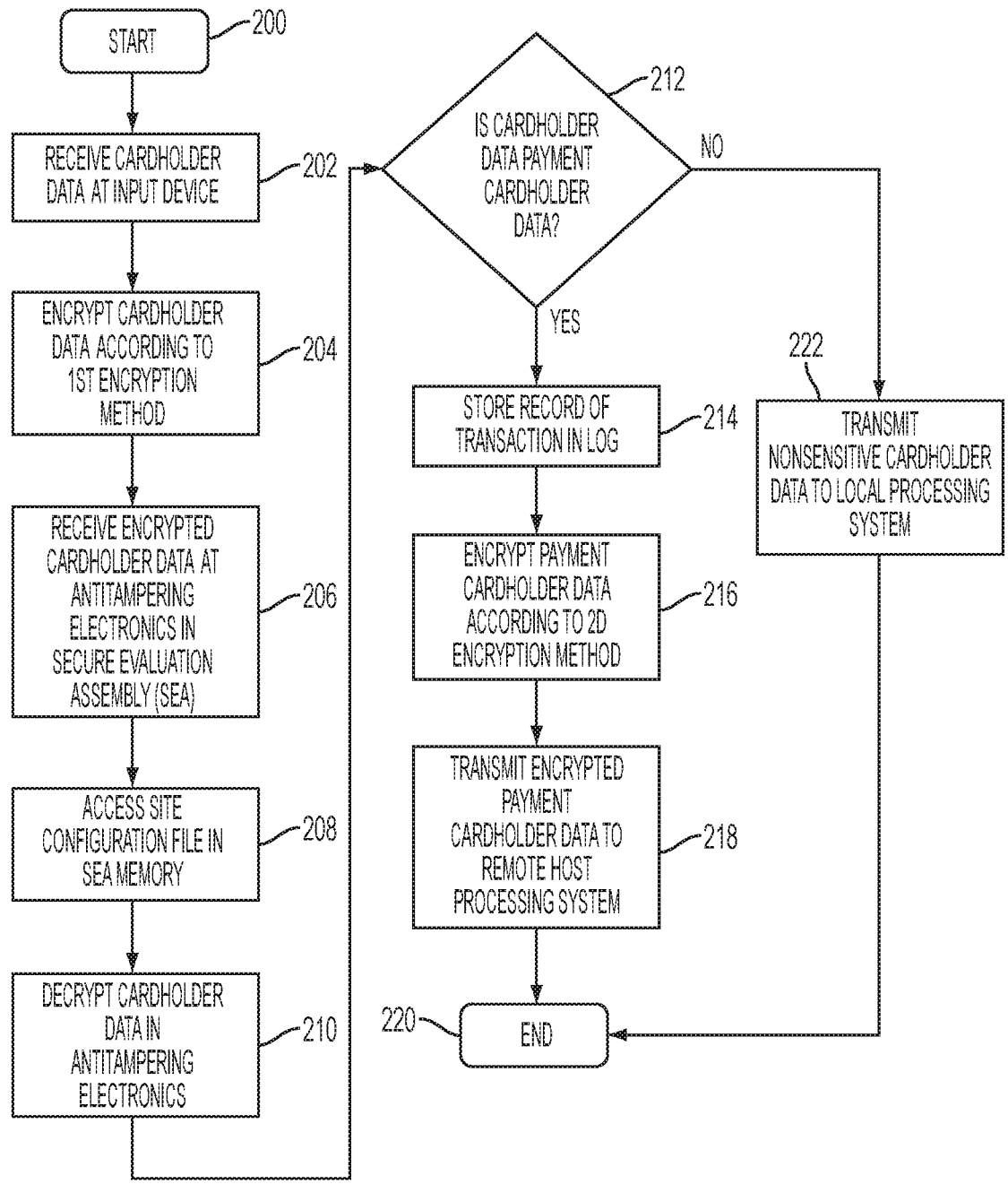
FIG. 5 is a flow chart illustrating an exemplary method for processing a transaction involving cardholder data using the system of FIG. 4.

FIG. 5 is a flow chart illustrating an exemplary method for processing a transaction involving cardholder data using the system of FIG. 4. The process starts (step 200) and a user initiates a transaction at input device 104. Input device 104 receives cardholder data from the user's payment device (step 202), immediately encrypts the cardholder data according to the first encryption method (step 204), and transmits the encrypted cardholder data to SEA 106. Encrypted cardholder data transmitted from input device 104 is received at antitampering control electronics 116 in SEA 106 (step 206).

As discussed above, antitampering control electronics 116 may preferably employ OTFE when accessing SEA memory 114. Thus, SEA memory 114 and/or the relevant data stored thereon may be automatically decrypted and encrypted using the keys of the third encryption method each time antitampering control electronics 116 reads from or writes to SEA memory 114.

Next, antitampering control electronics 116 may access a site configuration file stored in memory 114 (step 208). Further, using the decryption keys of the first encryption method, antitampering control electronics 116 may decrypt the cardholder data (step 210). The site configuration file preferably contains criteria that antitampering control electronics 116 may use to determine whether the cardholder data is payment cardholder data or nonsensitive cardholder data. Where an input device is adapted to receive payment cardholder data issued by more than one financial institution, the site configuration file may also contain a lookup table associating a portion of payment cardholder data, such as the first six digits of the PAN, with a particular financial institution.

Next, antitampering control electronics 116 may compare the cardholder data against the site configuration file stored in memory 114 to determine whether the cardholder data is payment cardholder data or nonsensitive cardholder data (step 212). If the data is payment cardholder data, antitampering control electronics 116 may store a record of the transaction in a log file in memory 114 (step 214). The stored data may include the total amount of the transaction and at least a portion of the payment cardholder data, such as the PAN associated with the customer's account. A merchant may require this information for various reasons, such as for accounting or reporting.

In an alternative embodiment, discussed in more detail below, antitampering control electronics 116 may instead store only a transaction lookup reference number in memory 114. The transaction lookup reference number may be unique to each transaction. In this case, the transaction details may be stored in a log file in an external memory, such as that of the cardholder data handling device or a remote system, along with the associated transaction lookup reference number. Thereby, payment cardholder data may remain securely encrypted without eliminating the ability of the merchant to perform transaction validation.

In any case, antitampering control electronics 116 may then encrypt the payment cardholder data using the encryption keys of the second encryption method stored in memory 114 (step 216). In one embodiment, the same second encryption method is used irrespective of the financial institution to which the payment cardholder data corresponds. In another embodiment, the site configuration file in memory 114 is used to identify which second encryption method to use when encrypting the payment cardholder data. In particular, the lookup table in the site configuration file may also contain the second encryption scheme required by each financial institution. In such an embodiment, multiple second encryption methods (corresponding to respective financial institutions) may also be stored within memory 114. Once the antitampering control electronics 116 identifies the financial institution associated with the payment cardholder data, the applicable second encryption method is selected and used to encrypt the payment cardholder data.

Antitampering control electronics 116 may finally transmit the encrypted payment cardholder data to remote host processing system 30 (step 218). The process then ends (step 220). The remote host processing system 30 may return a message either authorizing or denying authorization of the payment card transaction. According to a further embodiment, the antitampering control electronics may store this information in the log file in encrypted SEA memory 114.

Returning to step 212, if the cardholder data does not meet the criteria of payment cardholder data in the site configuration file in memory 114, the system may determine that the cardholder data is nonsensitive cardholder data. In this case, antitampering control electronics 116 may transmit the nonsensitive cardholder data in clear-text form to local processing system 112 (step 222). Local processing system 112 may use the nonsensitive cardholder data to provide a user credit for a transaction or a discount on fuel, for example. Although not illustrated in this embodiment, antitampering control electronics 116 may also store a record of the transaction in the log file. The process then ends (step 220).

As noted above, any cardholder data handling device may comprise an SEA, including a site controller, a POS, and a fuel dispenser control system. In some embodiments, depending on the amount of information stored, the transaction log file may become larger than the SEA memory. In this case, the memory (e.g., a hard disk) at the cardholder data handling device comprising the SEA may store the large transaction log, again encrypted according to the third encryption method. Then, the antitampering control electronics of the SEA may read from and write to the log in the manner described above. In a further embodiment, the transaction log file may be stored in and accessed on a remote system, such as a remote computer or server associated with a plurality of retail payment systems. Also, a back-up copy of the log may be periodically transmitted from the SEA to the remote system. Here, for example, the SEA may communicate with the remote system via off-site communication link 28, which in one embodiment may be routed through the Internet.

Figure 6:
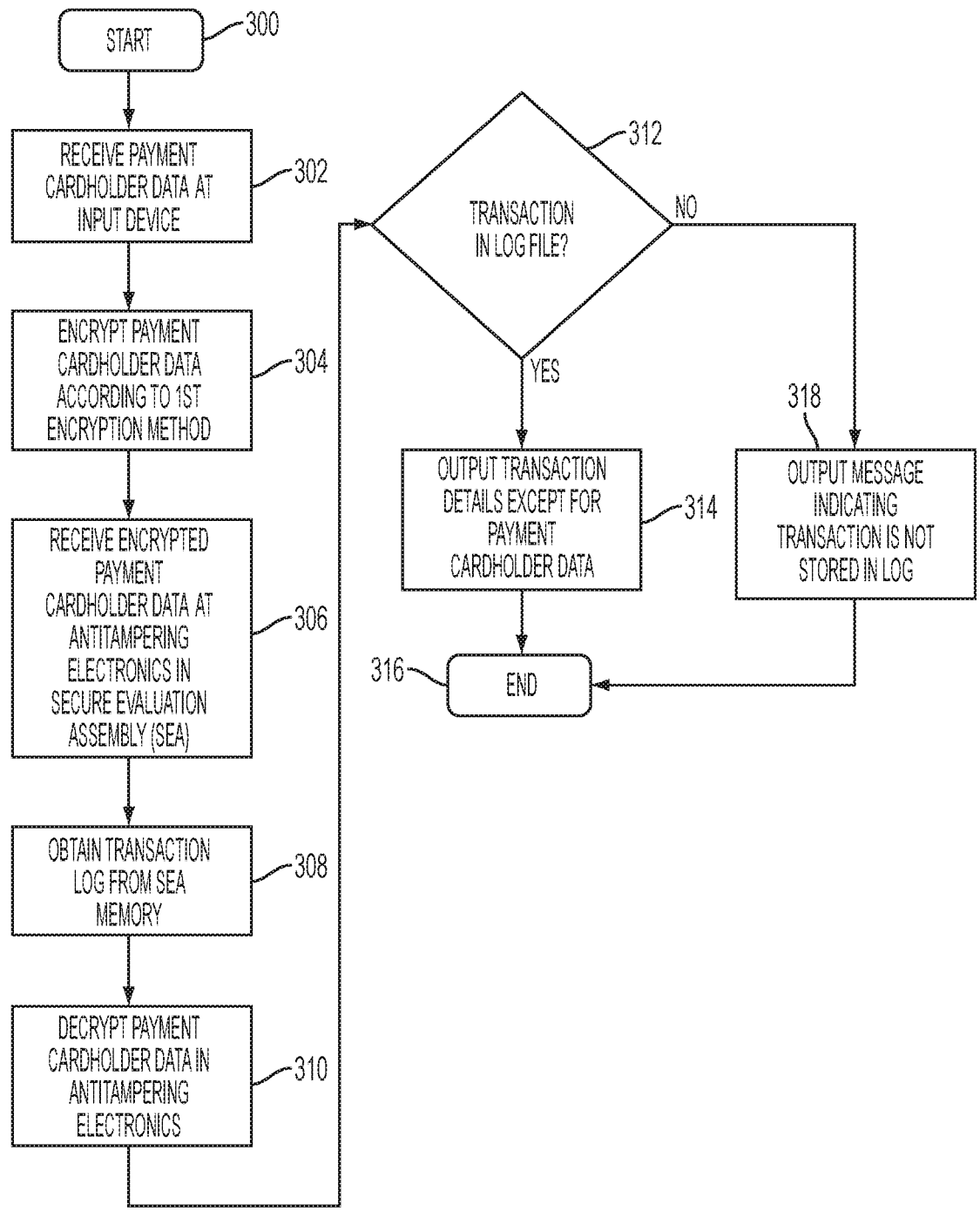
FIG. 6 is a flow chart illustrating an exemplary method for processing a request to validate a transaction involving payment cardholder data using the system of FIG. 4.

According to a further embodiment, the present invention contemplates a method by which a merchant may perform reconciliation or validation of a disputed transaction. In this regard, FIG. 6 is a flow chart illustrating an exemplary method for processing a request to validate a transaction involving payment cardholder data using the system of FIG. 4. The retail payment system may comprise an application programming interface (API) which allows a merchant to provide payment cardholder data from a customer disputing a transaction to the SEA and request information regarding whether the transaction is valid. As described below, the SEA is adapted to respond to this request in one embodiment without making payment cardholder data available in clear-text form. In other embodiments, it is contemplated that the API may be used in a similar fashion to perform reconciliation. The API may be implemented as a software program on a computer or server in operative communication with the SEA, such as at a computer or server associated with POS 22.

The process starts (step 300), and a merchant initiates a transaction validation request via the API and obtains a customer's payment cardholder data via input device 104 (step 302). Input device 104 immediately encrypts the payment cardholder data according to the first encryption method (step 304), and transmits the encrypted payment cardholder data to SEA 106. Encrypted payment cardholder data transmitted from input device 104 is received at antitampering control electronics 116 in SEA 106 (step 306).

Next, antitampering control electronics 116 may access a transaction log stored in memory 114 (step 308). As described above, because memory 114 is encrypted according to the third encryption method, antitampering control electronics 116, which possess the encryption and decryption key(s) of the third encryption method, may employ OTFE when accessing memory 114. Using the decryption keys of the first encryption method stored in memory 114, antitampering control electronics 116 may access the payment cardholder data (step 310).

Next, antitampering control electronics 116 may compare the payment cardholder data against the transaction log file stored in memory 114 to determine whether the payment cardholder data corresponds to a transaction processed at the merchant's site (step 312). If so, antitampering control electronics 116 may provide details regarding the transaction to the merchant, preferably omitting payment cardholder data (step 314). The details may include the time of the transaction, the amount charged, or the goods or services purchased. Thus, the merchant may obtain validation of a transaction without payment cardholder data being accessible in clear-text form. The process ends at step 316. However, based upon evaluation of the log file, if the payment cardholder data does not correspond to a transaction processed at the merchant's site, the antitampering control electronics may output an appropriate message to so inform the merchant (step 318). The process again ends at step 316.

In an alternative embodiment, where the transaction log is stored in a memory external to memory 114 of SEA 106 and associated with a transaction lookup reference number, a merchant may again initiate a transaction validation request as described above in steps 300-306. In this case, however, antitampering control electronics 116 may access the transaction lookup reference number for the requested transaction. Antitampering control electronics 116 may then provide the lookup reference number to the merchant. The merchant may use the lookup reference number to access the transaction details stored in a log in an external memory and associated with the lookup reference number.

Based on the above, those of skill in the art will appreciate that the SEA may provide E2EE of payment cardholder data. According to preferred embodiments, cardholder data is only decrypted and evaluated within the antitampering control electronics, and, when it is stored, payment cardholder data is stored in the SEA memory encrypted according to the third encryption method. The antitampering control electronics are preferably the only device in the retail payment system able to decrypt the SEA memory. Moreover, the antitampering control electronics may be programmed never to pass unencrypted payment cardholder data from the SEA. Such an arrangement may desirably satisfy certain security requirements of the payment card industry, or avoid such requirements altogether.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A secure evaluation assembly in which an encrypted communication of cardholder data from an input device to a remote host processing system may be securely evaluated, comprising:
 a secure semiconductor chip; and
 a secure evaluation assembly memory,
 said secure evaluation assembly memory containing information needed to decrypt data encrypted according to a first encryption method and information needed to encrypt data according to a second encryption method;
 wherein said secure semiconductor chip is programmed to:
  encrypt, according to a third encryption method, said information contained in said secure evaluation assembly memory;
  receive cardholder data from the input device, the cardholder data encrypted according to said first encryption method;
 access said information contained in the secure evaluation assembly memory and decrypt said information contained in the secure evaluation assembly memory according to the third encryption method;
 decrypt the cardholder data received from the input device according to the first encryption method to produce unencrypted cardholder data;
 determine whether at least a portion of the unencrypted cardholder data comprises a primary account number (PAN);
 if said at least a portion of the unencrypted cardholder data comprises a PAN:
  encrypt said unencrypted cardholder data according to said second encryption method to produce second encrypted cardholder data;
  transmit the second encrypted cardholder data to a remote hosting system as part of an authorization request for a transaction; and
  receive an authorization response message from the remote hosting system; if said at least a portion of the unencrypted cardholder data does not comprise a PAN:
  transmit said unencrypted cardholder data to a local processing system in clear- text form.

2. A secure evaluation assembly as in claim 1, wherein said first and second encryption methods are different.

3. A secure evaluation assembly as in claim 2, wherein said secure evaluation assembly memory contains information needed to encrypt data according to more than one second encryption method.

4. A secure evaluation assembly as in claim 3, wherein said secure control electronics selects the second encryption method after evaluating said unencrypted cardholder data.

5. A secure evaluation assembly as in claim 3, wherein said secure evaluation assembly memory contains a site configuration file.

6. A secure evaluation assembly as in claim 1, wherein said secure semiconductor chip is antitampering.

7. A secure evaluation assembly as in claim 1, said secure semiconductor chip comprising an internal memory storing information needed to decrypt data encrypted according to said third encryption method.

8. A secure evaluation assembly as in claim 7, wherein said third encryption method comprises AES-128.

9. A secure evaluation assembly as in claim 1, further comprising a universal serial bus interface.

10. A secure evaluation assembly as in claim 9, wherein said secure evaluation assembly is located at a cardholder data handling device.

11. A secure evaluation assembly as in claim 10, wherein said cardholder data handling device is selected from the group consisting of a fuel dispenser control system, a POS, and a site controller.

12. A secure evaluation assembly as in claim 1, wherein said secure semiconductor chip is further operative to evaluate said unencrypted cardholder data to perform transaction validation.

13. A secure evaluation assembly as in claim 12, wherein said secure evaluation assembly memory contains a transaction log file.

14. A secure evaluation assembly as in claim 1, wherein said secure evaluation assembly is implemented as an anti-tampering CPU.

\* \* \* \* \*